April 7, 1970  B. FÜTTERER  3,504,433
SUSPENSION FOR A RECIPROCABLE BLADE OF A SHAVER HEAD
Filed June 6, 1967  2 Sheets-Sheet 1
Fig. 1
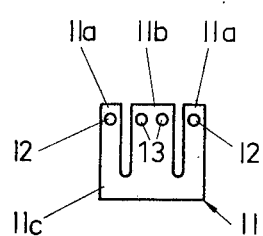
Fig. 2
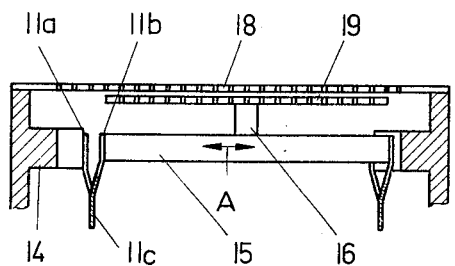
Fig. 4
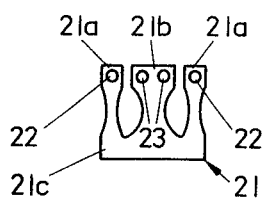
Fig. 3
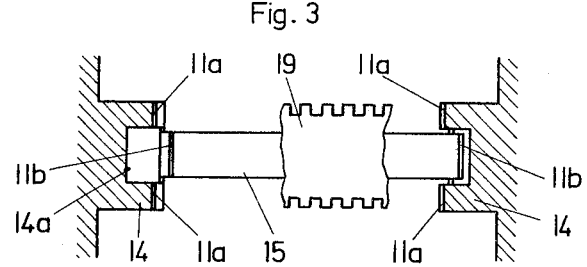
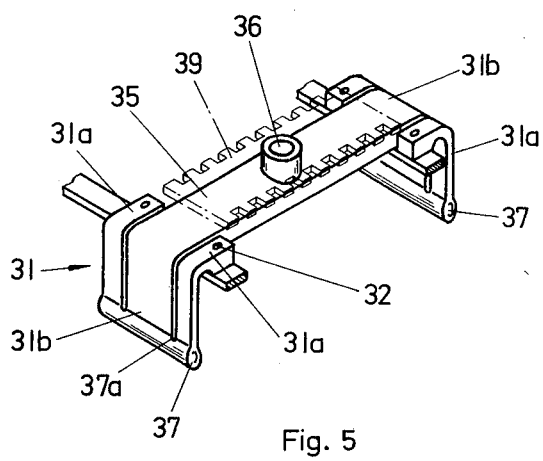
Fig. 5
Fig. 6
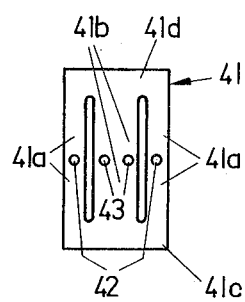

United States Patent Office 3,504,433
Patented Apr. 7, 1970

3,504,433
SUSPENSION FOR A RECIPROCABLE BLADE OF A SHAVER HEAD
Bodo Fütterer, Sarnen, Obwalden, Switzerland, assignor, by mesne assignments, to The Gillette Company, Boston, Mass., a corporation of Delaware
Continuation-in-part of application Ser. No. 514,541, Dec. 17, 1965. This application June 6, 1967, Ser. No. 643,991
Int. Cl. B26b 19/02
U.S. Cl. 30—43.92                          12 Claims

ABSTRACT OF THE DISCLOSURE

A shaver head having a reciprocating cutter blade cooperating with a shear comb and resilient suspension means maintaining said cutter blade relative to said shear comb. The resilient suspension means is connected to a support to which a shear comb is rigidly mounted, and, also, is connected to the reciprocable cutter blade so as to resiliently urge the cutter blade into intimate contact with the shear comb and insure rectilinear longitudinal movement of the cutter blade.

---

This application is a continuation-in-part of my copending application Ser. No. 514,541, filed Dec. 17, 1965, now abandoned.

My present invention relates to a suspension for a reciprocable blade of a shaver head cooperating, in the usual manner, with an adjoining stationary shear comb which is rigid with a fixed support and which may take the form of a perforated foil, e.g., as described in my said copending application.

As the reciprocating blade must remain in intimate contact with the fixed shear comb at all points in order to afford a close shave, it is necessary in the case of flat shavers to provide this blade with suspension means ensuring it rectilinear longitudinal movement. The use of straight guide rails for this purpose has proved to be unsatisfactory since it generates a considerable amount of friction; where this friction is reduced by the interposition of ball or roller bearings, objectionable chattering or noise of the shaver may ensue.

It is, therefore, a main object of my present invention to provide an improved blade suspension for such shaver heads which ensures a rectilinear reciprocating motion of the blade or cutter with a minimal of frictional resistance and without objectionable noise.

A further object is to provide means in such shaver head for exerting upon an elongated holder, designed to carry the reciprocable blade, a positive force resiliently urging the blade in intimate contact with the stationary shear comb without generation of excessive friction between the cooperating cutting elements.

A still further object is to provide an improved blade suspension for such shaver heads which is of simple construction and does not afford any maintenance.

The invention provides an improved blade suspension of compact design which enables the construction of electric safety razors of minimized volume.

Still another object resides in providing an improved blade suspension of easy construction, which resiliently urges the cutter blade against a stationary shear comb.

The main object is realized, in conformity with my present invention, by the provision of a pair of elongated spring means, each being connected to opposite ends of a cutter blade holder. Another pair of elongated spring means, which are rigidly connected with one of their end to a fixed support for said shear comb or to the casing of the shaver, are being arranged in adjacent and approximately parallel relationship or in an acute angle to said first pair of elongated spring means, and being arranged such that the free ends of adjacent spring means, e.g., those ends, which are not fastened at the cutter blade holder and at the fixed support, are disposed adjacent each other and are being rigidly connected. The stiffness and the lengths of said spring means are chosen in such a manner that upon deflection of the cutter blade holder the components of the lengths of all spring means perpendicular to the direction of movement of the cutter blade holder decrease about equal amounts.

The above mentioned and other objects and novel features of my present invention will appear more fully hereinafter from the following detailed description of the invention when taken in connection with accompanying drawings wherein several embodiments of my invention are illustrated. It is to be expressly understood, however, that the drawings are utilized for purposes of illustration only and are not designed as a definition of the limits of the invention, reference being had for this purpose to the appended claims.

In the drawings:

FIG. 1 is a front elevation view of a suspension means according to my invention;

FIG. 2 is a side elevation view of a cutter blade holder together with a mounting therefor in cooperation with a pair of suspension means as shown in FIG. 1;

FIG. 3 is a top plan view (parts broken away) of the assembly of FIG. 2;

FIG. 4 is a view similar to FIG. 1 showing a modified suspension means adapted for the use in the assembly of FIGS. 2 and 3;

FIG. 5 is a perspective view of an assembly similar to that of FIGS. 2 and 3 but with a further modification of its suspension means;

FIG. 6 is a view similar to FIGS. 1 and 4, illustrating still another modification;

Figures 7, 8:
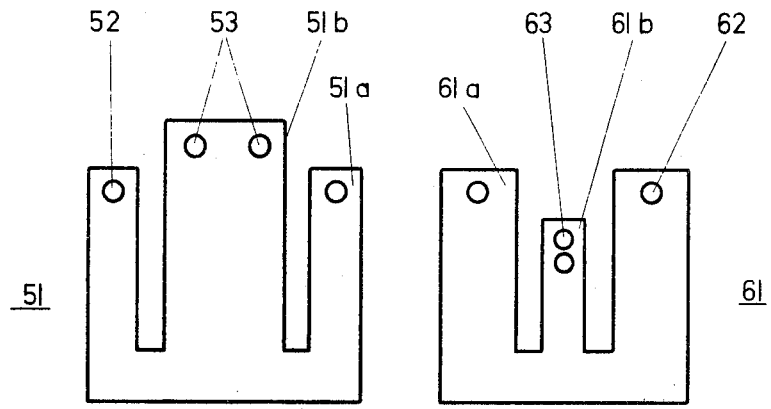
FIG. 7 is a view similar to FIG. 1 showing a suspension means wherein the elongated spring means are of unequal length.
FIG. 8 is a view similar to FIG. 1 showing another suspension means with elongated spring means of unequal length.

In FIG. 1 I have shown a resilient suspension leaf 11 comprising three upstanding legs 11a, 11b, the central leg 11b being flanked by the outer legs 11a and having a width equal to the sum of the widths of these outer legs. Mounting holes 12 in legs 11a and 13 in leg 11b serve for the passage of screws or other fastening means for securing the suspension leaf 11 to a fixed support 14 and to a cutter blade holder 15 as illustrated in FIGS. 2 and 3.

The cutter blade holder 15 is an elongated bar attached at opposite ends to the center legs 11b of two resilient suspension leaves 11 whose outer legs 11a are fastened to the support 14 forming part of a shaver head. This support is rigid with a shear comb 18 overlying a movable blade 19 which is detachably mounted on the bar 15 through the intermediary of a boss 16. Support 14 is shown recessed at 14a to accommodate the center leg 11b of either suspension leaf 11 when the holder 15 is reciprocated by conventional drive means not shown, in the direction of arrow A of FIG. 2. This holder has a neutral position in which the legs 11b of the two suspension leaves just clear the recesses 14a and are coplanar with the respective legs 11a. As the holder 15 moves out of this neutral position, the legs 11a and 11b of each suspension leaf form opposite arms of an upstanding V whose vertex rises with increasing spread of the legs; the upper ends of the legs, however, remain on the same level, i.e., the level of attachment of legs 11a to support 14, so that the blade 19 on its holder 15 stays in the same horizontal plane as it reciprocates next to the counterblade 18. This is true because the legs 11a, 11b deflect symmetrically from their coplanar position by virtue of the fact that in confronting cross-sections, i.e., at the same distance from their integral junction 11c, they have equal moduli of flexural resistance.

FIG. 4 shows an alternate suspension leaf 21 whose legs 21a, 21b, respectively provided with mounting holes 22 and 23, differ from those of suspension leaf 11 by progressively diminishing in cross-section toward the midpoint of their length so as to exhibit a substantially constant specific bending stress. This stress distribution enables the suspension leaves to be made thinner than in the preceding embodiment for a given amplitude of reciprocating movement. Naturally, the tapering of the cross-section of each leg could also occur in the thickness dimension thereof. Again, as before, the sum of the widths of the outer legs 21a equals that of the inner leg 21b at any given distance from the junction 21c.

In FIG. 5 I have shown a pair of suspension members 31 whose legs 31a, 31b are bent at the top into the plane of the cutter blade holder 35. The holder 35 in this case forms an integral extension of the central legs 31b of both suspension members, the assembly here being advantageously molded from a resilient plastic material. Mounting holes 32 set at the free ends of legs 31a serve again to attach the assembly to the wall of the shaver head. The reciprocable cutter blade 39 is mounted on a holder 35 via a boss 36.

In this embodiment the integral junction between the legs 31a, 31b of each suspension member 31 is formed by a rod-shaped hinge element 37 which is slightly scored at 37a to provide improved relative mobility for these legs. If the scoring were deepened, mobility would be further increased but some additional friction may be generated between adjoining portions of hinge element 37.

As shown in FIG. 6, it is possible to complement the disclosed suspension members by a second junction 41d of their legs 41a, 41b located, substantially mirror-symmetrically with reference to the first junction 41c, on the opposite side of their points of connection as represented by mounting holes 42, 43. This symmetrical suspension 41 could, of course, be modified in the manner illustrated in FIG. 4 so as to have a substantially constant bending stress throughout the length of each leg.

FIG. 7 shows a further modification of the suspension member shown in FIG. 1, wherein the central leg 51b is longer than each of the outer legs 51a, so that the cutter blade holder when fastened (not shown) at mounting holes 53 of the inner leg, may overtop the free ends of outer legs 51a provided with mounting holes 52 for attaching the suspension member at the support of the shear comb (not shown) or at the casing of the shaver. This embodiment is particularly useful for shavers of compact design.

FIG. 8 shows an alternate suspension leaf 61 whose legs 61a, 61b, respectively provided with mounting holes 62 and 63, are of unequal length. This embodiment is similar to that of FIG. 7, except that the outer legs 61a are longer than the central leg 61b. Advantageously the cutter blade holder (not shown) should be fastened at mounting holes 62 of the outer legs 61a, whereas the central leg 61b is secured with mounting holes 63 at a fixed support or casing.

Generally, the elongated spring means of each suspension means may lie in a common plane. However, as is shown in the cross-sectional or side view of FIG. 9, the inner leg 71b may form an acute angle with each of the outer legs 71a, thus providing a suspension that is not only resilient in the direction of the reciprocating movement, but also in a perpendicular direction thereto.

Figures 9, 10:
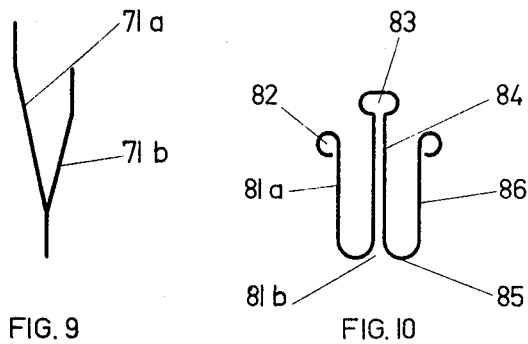
FIG. 9 is a side view of a modification of the suspension means shown in FIG. 8.
FIG. 10 is a view similar to FIG. 1 showing a suspension means made of spring wire.

FIG. 10 illustrates a suspension means made of spring-wire. The inner or central leg 81b has an elongated loop portion 83 which serves as mounting means of the central leg. The open end of said loop portion is continued by a pair of spring-wire portions 84 being arranged in parallel and adjoining relationship about part of their length, thus forming the central leg, and being bent back at 85 to form a pair of outer legs 86. Loops 82 are formed at the ends of the outer legs to serve as mounting means. The suspension means according to FIG. 10 is self-centering since it is resilient in three orthogonal directions. Resiliency in a direction perpendicular to the direction of movement of the cutter blade holder may be increased by forming an acute angle between the central leg 81b and the outer legs 81a in the plane of movement of the suspension member in the neutral position of the same.

It is within the scope of my invention to rigidly secure either the central leg or the outer leg or legs whereas the other legs may be articulated at parts of the razor. Further, it should be recognized that the benefits of my invention will be present if the central leg as well as the outer legs were articulated at the respective parts of the razor. In this case, of course, one must take care of avoiding unstable static conditions, and to this end all legs of each suspension member should lie within a common plane. However, it is more advantageous to rigidly secure at least one resilient means or leg of each suspension means at coordinated parts of the razor.

It will be well aware to those skilled in the art that my invention provides a rectilinear reciprocating movement of the movable end of my suspension means by combining the oscillatory movements of two resilient means, both being arranged in approximately anti-parallel relationship and the suspension end of one of said resilient means being stationary, whereas the suspension end of the other resilient means is coupled to the oscillating end of the aforementioned resilient means. Thus, a sort of double-pendulum is formed whereby one pendulum is hinged at the other one and is turned about 180 degrees in its neutral position. It is within the knowledge of those skilled in the art to find the length of each of the resilient means of my suspension means for given values of flexibility of the same, vice versa.

What I claim is:

1. In a shaver head comprising a reciprocable cutter blade disposed in intimate contact with a stationary shear comb, the combination therewith of suspension means for movably securing said cutter blade to a fixed support of said shear comb, said suspension means comprising an elongated cutter blade holder, first resilient means connected with one of its ends to one end of said cutter blade holder, second resilient means connected with one of its ends to the other end of said cutter blade holder, third resilient means connected with one of its ends to said fixed support, fourth resilient means connected with one of its ends to said fixed support, said third and fourth resilient means being arranged in adjacent and parallel relationship to said first and second resilient means, respectively, and being arranged thus that the free ends of adjacent resilient means are disposed adjacent each other, first connecting means fixedly connecting the free ends of said first and third resilient means with one another, second connecting means fixedly connecting the free ends of said second and fourth resilient means with one another, and the dimensioning of said resilient means such that at at least one definite deflection of the cutter blade holder the components of the length of said first, second, third and fourth resilient means normal to the direction of movement of said cutter blade holder have decreased about equal amounts.

2. The combination and dimensioning defined in claim 1 wherein said resilient means consist of leaf springs.

3. The combination and dimensioning defined in claim 1, wherein said resilient means are of equal length.

4. The combination and dimensioning defined in claim 1 wherein said first and second resilient means form integral parts with said third and fourth resilient means, respectively.

5. The combination and dimensioning defined in claim 1 wherein at least one of said resilient means at each side of the cutter blade holder consists of a pair of elongated springs flanking the other one of said resilient means at the respective side of the cutter blade holder.

6. The combination and dimensioning defined in claim 1 wherein said resilient means form elongated springs the cross-sectional area of which progressively decrease toward a mid-point of their length.

7. The combination and dimensioning defined in claim 1 wherein said first and second connecting means form rod-shaped portions integral with said free ends of said resilient means at each side of the cutter blade holder.

8. The combination and dimensioning defined in claim 1 wherein a second set of resilient means and of connecting means is provided and arranged mirror-picture like relative to the first set of resilient means and of connecting means.

9. In a shaver head comprising a reciprocable cutter blade disposed in intimate contact with a stationary shear comb, the combination therewith of suspension means for movably securing said cutter blade to a fixed support of said shear comb, said suspension means comprising an elongated cutter blade holder, first elongated spring means connected with one of its ends to one end of said cutter blade holder, second elongated spring means connected with one of its ends to the other end of the cutter blade holder, third elongated spring means connected with one of its ends to said fixed support, fourth elongated spring means connected with one of its ends to said fixed support, said third and fourth elongated spring means being arranged in adjacent and parallel relationship to said first and second elongated spring means, respectively, and being arranged such that the free ends of adjacent spring means are disposed adjacent each other, said free ends of adjacent spring means being integrally connected with one another, and the dimensioning of said spring means such that at any deflection of the cutter blade holder the components of the lengths of said first, second, third, and fourth spring means normal to the direction of movement of said cutter blade holder have decreased about equal amounts relative to their neutral positions.

10. The combination and dimensioning defined in claim 9 wherein said first and second elongated spring means are unequal in length to said third and fourth elongated spring means.

11. In a shaver head comprising a reciprocable cutter blade disposed in intimate contact with a stationary shear comb, the combination therewith of suspension means for movably securing said cutter blade to a fixed support of said shear comb, said suspension means comprising an elongated cutter blade holder, first elongated spring means connected with one of its ends to one end of said cutter blade holder, second elongated spring means connected with one of its ends to the other end of said cutter blade holder, third elongated spring means rigidly connected with one of its ends to said fixed support, fourth elongated spring means rigidly connected with one of its ends to said fixed support, said third and fourth elongated spring means being arranged adjacent to and forming an acute angle with said first and second spring means, respectively, and being arranged such that the free ends of adjacent spring means are disposed adjacent each other, said free ends of adjacent spring means being integrally connected with one another, and the dimensioning of said spring means such that at least one definite deflection of the cutter blade holder the components of the lengths of said first, second, third and fourth spring means normal to the direction of movement of said cutter blade holder have decreased about equal amounts relative to their neutral positions.

12. The combination and dimensioning defined in claim 11 wherein said first and second spring means are rigidly connected to said cutter blade holder.

References Cited

UNITED STATES PATENTS

| 2,530,759 | 11/1950 | Collins et al. | 30—41.6 X |
| 3,105,298 | 10/1963 | Carissimi | 30—43.92 |
| 3,144,714 | 8/1964 | Beisma | 30—43.92 |

ROBERT C. RIORDON, Primary Examiner

G. F. GRAFEL, Assistant Examiner